3,637,746
PROCESS FOR PREPARING N-ARYL-α-OXOCYCLO-POLYMETHYLENE AMINES AND RELATED COMPOUNDS
Peter H. L. Wei, Upper Darby, and Stanley C. Bell, Penn Valley, Pa., assignors to American Home Products Corporation, New York, N.Y.
No Drawing. Filed June 10, 1968, Ser. No. 735,540
Int. Cl. C07d 27/08
U.S. Cl. 260—326.5         1 Claim

ABSTRACT OF THE DISCLOSURE

The invention is directed to N-aryl-α-oxocyclopolymethylene amines and N-aryl-α-oxo-α'-iminocyclopolymethylene amines which are central nervous system depressants.

---

This invention relates to new and novel N-aryl-α-oxocyclopolymethylene amines and N-aryl-α-oxo-α'-iminocyclopolymethylene amines and to a process for their preparation.

The compounds within the purview of the present invention are exemplified by those having the following formula:

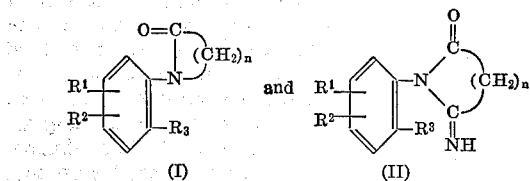

Where
R$^1$ and R$^2$ are hydrogen, halogen, lower alkyl, lower alkoxy or sulfamoyl;
R$^3$ is halogen, lower alkyl, lower alkoxy; and
$n$ is an integer from 2 to about 4.

As used herein, the terms "lower alkyl," "lower alkoxy" and the like describe groups containing from 1 to 8 carbon atoms.

When the compounds of this invention are depicted by structural Formula I they are generically designated as "N-aryl-α-oxocyclopolymethylene amines." A typical example of these compounds when $n=2$ is 1-(2,6-dichlorophenyl)-2-azetidinone; when $n=3$ is 1-(2-methoxy-4-chlorophenyl)-2-pyrrolidinone; and when $n=4$ is 1-(2,4-diethyl-6-sulfamoylphenyl)-2-piperidinone.

Alternatively, when the compounds of this invention are depicted by structural Formula II they are generically designated as "N-aryl-α'-imino-α-oxocyclopolymethylene amines." A typical example of these compounds when $n=2$ is 1-(2,6-dichlorophenyl)-5-iminopyrrolidin-2-one; when $n=3$ is 1-(2-methoxy-4-chlorophenyl)-6-iminopiperidin-2-one; and when $n=4$ is 1-(2,4-diethyl-6-sulfamoylphenyl)-7-iminohexahydroazepin-2-one.

The new and novel compounds of this invention may be prepared by the process which is hereinafter schematically illustrated.

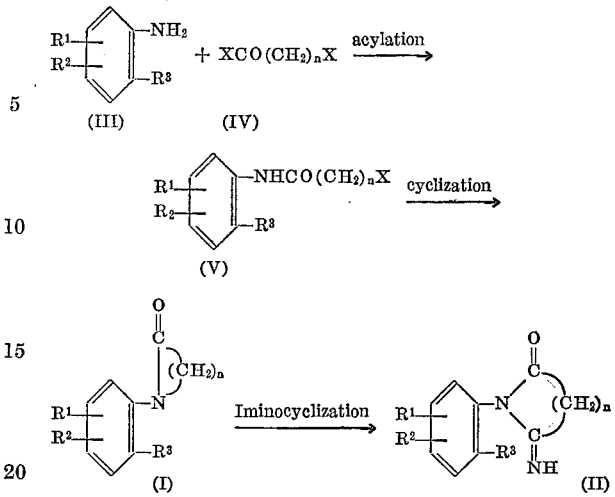

To prepare the N-aryl-α-oxocyclopolymethylene amines (I) and the N-aryl-α-oxo-α'-iminocyclopolymethylene amines (II) of the present invention, a two step procedure is utilized. In the first step a 2-substituted aniline (III) is contacted with a haloalkanoyl halide (IV) in an organic solvent, such as chloroform, at a temperature range from about 0° C. up to the reflux temperature for a period of about 1 to about 4 hours. When the reaction is complete, the resulting intermediate compound haloalkanoyl anilide (V) may be separated and recovered by well known means. For example, the reaction mixture is allowed to stand until separation of the product is complete. Thereafter, the solvent may be removed and the residual solid collected and washed with a small amount of organic solvent such as chloroform, hexane, benzene or ether, and the solid recrystallized from an appropriate solvent such as ethanol, acetonitrile or benzene.

To prepare the N-aryl-α-oxocyclopolymethylene amines (I) of this invention the above prepared haloalkanoyl anilide (V) is heated with an alkali metal cyanide in an alkanol in the presence of a catalyst, for example sodium iodide, at a temperature range from about 50 to about 100° C., preferably the reflux temperature, for a period of about 1 to 20 hours affording the product a N-aryl-α-oxocyclopolymethylene amine (I) of this invention. The product may be separated and recovered by well known techniques. For instance, the inorganic material may be filtered off, the filtrate evaporated to dryness, and the residual solid recrystallized from a suitable organic solvent, such as ethanol. Preferably this reaction is conducted with potassium cyanide, in ethanol, in the presence of a catalytic amount of sodium iodide, at reflux temperatures for about 6–20 hours.

To prepare the N-aryl-α-oxo-α'-iminocyclopolymethylene amines (II) of the present invention, a haloalkanoyl anilide (V) is heated with an alkali metal cyanide in an alkanol, e.g. absolute ethanol, at a temperature range of about 50 to about 100°, for a period of about 6 to 20 hours. Preferably this reaction is conducted with potassium cyanide in ethanol at reflux temperatures for about eight hours. The product (II) is recovered by well known techniques. For instance, the inorganic material may be removed and the residue concentrated and then dissolved in benzene. The benzene solution is then washed with water, dried over magnesium sulfate, and treated with activated carbon, such as Darco. After the benzene is removed the residue may be dissolved in ethanol, whereupon the solution upon scratching will afford the product N-aryl-α-oxocyclopolymethylene amine (I) as a precipitate which is filtered off. Thereafter the filtrate is evaporated, and the residue dissolved in ether, the ether solution on cooling yields the N-aryl-α-oxo-α'-iminopolymethylene amine (II) of the present invention.

The new and novel N-aryl-α-oxocyclopolymethylene amines (I) and N-aryl-α-oxo-α'-iminocyclopolymethylene amines (II) of the present invention have exhibited depressant properties. That is, they produce a calming effect in the host.

In the pharmacological evaluation of the central nervous system activity of the compounds of this invention, the in vivo effects are tested as follows. The compound is administered orally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spantaneous motor activity, decreased respiration) and autonomic activity (i.e., miosis, mydriasis, diarrhea) are noted. The compounds of the present invention in the above test procedure induce depressant effects at 127 to 400 milligrams per kilogram of host body weight (mg./kg.).

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups; and then dehydrated sufficiently to make it suitable for pressing into a solid form. They may be administered orally in the form of solutions or they may be injected parenterally, that is, intramuscularly, intravenously or subcutaneously. For parenteral administration they may be used in the form of a sterile solution containing other solutes, for example, enough saline or glucose to make the solution isotonic.

The dosage of the present pharmacological agents will vary with the form of administration and the particular compound chosen. Furthermore, it will vary with a particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

In order more clearly to disclose the nature of the present invention, specific examples of the practice of the invention are hereinafter given. It should be understood, however, that this is done solely by way of example and is intended neither to delineate the scope of the invention or limit the ambit of the appended claims.

EXAMPLE 1

The following example illustrates the preparation of 2'3,6' - trichloropropionanilide and 1 - (2,6-dichlorophenyl)-2-azetidinone.

Step A

To 200 g. (1.23 m.) of 2,6-dichloroaniline in 500 ml. of chloroform is added a solution of 200 g. (1.60 m.) of 3-chloropropionyl chloride in 200 ml. chloroform. The mixture is heated to reflux for 4 hours and let stand overnight. The white solid which separates is collected and washed with ethanol and ether. The crude material weighs 276 g. The pure 2',3,6'-trichloropropionanilide is obtained by recrystallization from ethanol and has a melting point of 140–141° C.

*Analysis.*—Calculated for $C_9H_8Cl_3NO$ (percent): C, 42.81; H, 3.19; Cl, 42.12; N, 5.55. Found (percent): C, 42.99; H, 3.16; Cl, 41.85; N, 5.62.

Step B

A solution of 7.5 g. (0.03 m.) of 2',3,6'-trichloropropionanilide and 2.9 g. (0.45 m.) of potassium cyanide are heated to reflux in 200 ml. of absolute ethanol for 8 hours. After removal of inorganic material, the solvent is removed and the residue picked up in benzene. The benzene solution is first washed with water, then dried over anhydrous magnesium sulfate and treated with Darco. After benzene is removed, the residue is dissolved in 10 ml. of ethanol. The solution upon scratching affords 1.2 g. of 1-(2,6-dichlorophenyl)-2-azetidinone. After recrystallization from the same solvent the product has a melting point of 112–113° C.

*Analysis.*—Calculated for $C_9H_7Cl_2NO$ (percent): C, 50.01 H, 3.26; Cl, 32.81; N, 6.48. Found (percent): C, 50.47; H, 3.19; Cl, 32.91; N, 6.68.

EXAMPLES 2–14

Following the procedure of Example 1 but substituting the following starting materials for 2',3,6' - trichloropropionanilide the following products are obtained.

| Example | Starting material | Product, step B | Product, step C |
|---|---|---|---|
| 2 | 2', 4, 4', 6'-tetrabromobutyranilide | 1-(2,4,6-tribromophenyl)-2-pyrrolidinone | 1-(2,4,6-tribromophenyl)-6-iminopiperidin-2-one. |
| 3 | 5-chloro-2',4'-difluoro-6'-sulfamoyl-valeranilide | 1-(2,4-difluoro-6-sulfamoylphenyl-)2-piperidinone | 1-(2,4-difluoro-6-sulfamoylphenyl)-7-iminohexahydroazepin-2-one. |
| 4 | 3,5'-dichloro-2',4'-diiodopropionanilide | 1-(5-chloro-6,4-diiodophenyl)-2-azetidinone | 1-(5-chloro-2,4-diiodophenyl)-5-iminopyrrolidin-2-one. |
| 5 | 4,6'-dichloro-2',5'-dimethylbutyranilide | 1-(6-chloro-2,5-dimethylphenyl)-2-pryrrolidinone | 1-(6-chloro-2,5-dimethylphenyl)-6-iminopiperidin-2-one. |
| 6 | 4',5-dibromo-2'-ethyl-6'-propylvaleranilide | 1-(4-bromo-2-ethyl-6-propylphenyl)-2-piperidinone | 1-(4-bromo-2-ethyl-6-propyphenyl)-7-iminohexahydroazepin-2-one. |
| 7 | 3-chloro-3'-ethyl-5'fluoro-2'-propylpropionanilide | 1-(3-ethyl-5-fluoro-2-propylphenyl)-2-azetidinone | 1-(3-ethyl-5-fluoro-2-propylphenyl)-5-iminopyrrolidin-2-one. |
| 8 | 2',5'-dibutyl-4,4'-diiodobutyranilide | 1-(2,5-dibutyl-4-iodophenyl)-2-pyrrolidinone | 1-(2,5-dibutyl-4-iodophenyl)-6-iminopiperidin-2-one. |
| 9 | 5-chloro-3'-methyl-2',5'-dimethoxyvaleranilide | 1-(3-methyl-2-5-dimethoxyphenyl)-2-piperidinone | 1-(3-methyl-2,5-dimethoxyphenyl)-7-iminohexahydroazepin-2-one. |
| 10 | 3-bromo-4'-butoxy-6'-ethyl-2'-ethoxy-propionanilide | 1-(4-butoxy-6-ethyl-2-ethoxyphenyl)-2-azetidinone | 1-(4-butoxy-6-ethyl-2-ethoxyphenyl)-5-iminopyrrolidin-2-one. |
| 11 | 4,6'-dichloro-4'-methoxy-2'-propoxybutyranilide | 1-(6-chloro-4-methoxy-2-propoxyphenyl)-2-pyrrolidinone | 1-(6-chloro-4-methoxy-2-propoxyphenyl)-6-iminopiperidin-2-one. |
| 12 | 5,5'-dibromo-2',3'-dibutoxyvaleranilide | 1-(5-bromo-2,3-dibutoxyphenyl)-2-piperidinone | 1-(5-bromo-2,3-dibutoxyphenyl)-7-iminohexahydroazepin-2-one. |
| 13 | 2',3-dichloro-4'-sulfamoylpropionanilide | 1-(2-chloro-4-sulfamoylphenyl)-azetidinone | 1-(2-chloro-4-sulfamoylphenyl)-5-iminopyrrolidin-2-one. |
| 14 | 2',4-dichloro-5'-methylbutyranilide | 1-(2-chloro-5-methylphenyl)-pyrrolidinone | 1-(3-chloro-5-methylphenyl-6-iminopiperidin-2-one. |

EXAMPLE 15

This example illustrates the preparation of 1-(2,6-dichlorophenyl)-5-iminopyrrolidin-2-one.

Following the procedure of step A of Example 1, 2',3,6'-trichloropropionanilide is prepared.

A solution of 7.5 g. (0.03 m.) of 2',3,6'-trichloropropionanilide and 2.9 g. (0.045 m.) of potassium cyanide are heated to reflux in 200 ml. of absolute ethanol for 8 hours. Inorganic material is removed, and the residue is concentrated, then dissolved in benzene. The benzene solution is first washed with water, then dried over anhydrous magnesium sulfate and treated with Darco. After benzene is removed, the residue is dissolved in 10 ml. of ethanol. The solution upon scratching affords 1.2 g. of 1-(2,6-dichlorophenyl)-2-azetidinone. Ethanol is removed from the above filtrate and the residue dissolved in ether. The ether solution yields 1.4 g. of 1-(2,6-dichlorophenyl)-5-iminopyrrolidin-2-one. Recrystallization from cyclohexane affords the pure compound having a melting point of 147–149° C.

*Analysis.*—Calculated for $C_{10}H_8Cl_2N_2O$ (percent): C, 49.40; H, 3.32; Cl, 29.17; N, 11.53. Found (percent): C, 49.47; H, 3.59; Cl, 28.78; N, 11.45.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:
1. 1-(2,6-dichlorophenyl)-5-iminopyrrolidin-2-one.

References Cited

UNITED STATES PATENTS

| 2,285,511 | 6/1942 | Haddock | 260—325 |
| 3,423,412 | 1/1969 | Taylor | 260—326.5 |

OTHER REFERENCES

Wagner and Took, Synthetic Organic Chem., New York, John Wiley, p. 591.

Seidel, Chem. Abstracts, 1967, vol. 66, 18638m (note original article in J. Heterocyclic Chem. (1966)).

Manhas et al., Chem. Abstracts 1967, vol. 67, 82023e, note this is based on article in J. Organic Chem. of April 1967.

Hawkins et al., Chem. Abstracts 1958, vol. 52, 7518b.

ALEX MAZEL, Primary Examiner

B. I. DENTZ, Assistant Examiner

U.S. Cl. X.R.

260—239; 424—277, 244

UNITED STATES PATENT OFFICE
CERTIFICATE OF CORRECTION

Patent No. 3,637,746          Dated January 25, 1972

Inventor(s) Peter H. L. Wei and Stanley C. Bell

It is certified that error appears in the above-identified patent and that said Letters Patent are hereby corrected as shown below:

In the structural diagram at page 1, column 2, formula V, I and II should read as follows:

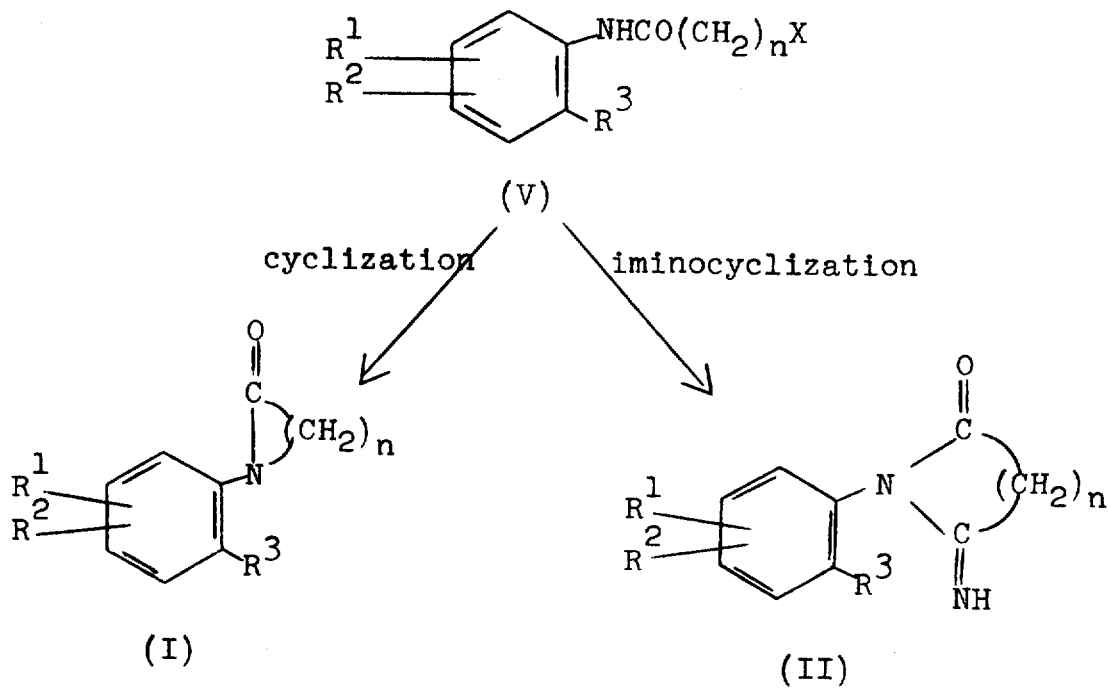

Signed and sealed this 11th day of July 1972.

(SEAL)
Attest:

EDWARD M. FLETCHER, JR.          ROBERT GOTTSCHALK
Attesting Officer                 Commissioner of Patents